(12) United States Patent
Hamm et al.

(10) Patent No.: US 11,785,694 B2
(45) Date of Patent: Oct. 10, 2023

(54) CIRCADIAN LIGHTING IN A DIVERSE HOME AUTOMATION SYSTEM

(71) Applicant: Savant Systems, Inc., Hyannis, MA (US)

(72) Inventors: Andrew R. Hamm, East Sandwich, MA (US); Kevin C. Kicklighter, Cottonwood, UT (US); Anthony J. Fritts, Marshall, NC (US); Yue Zhou, Bourne, MA (US); Alejandro Orellana, Mashpee, MA (US)

(73) Assignee: Savant Systems, Inc., Hyannis, MA (US)

( * ) Notice: Subject to any disclaimer, the term of this patent is extended or adjusted under 35 U.S.C. 154(b) by 0 days.

(21) Appl. No.: 17/018,556

(22) Filed: Sep. 11, 2020

(65) Prior Publication Data
US 2021/0084733 A1    Mar. 18, 2021

Related U.S. Application Data

(60) Provisional application No. 62/899,166, filed on Sep. 12, 2019.

(51) Int. Cl.
*H05B 47/11*    (2020.01)
*H05B 47/175*    (2020.01)
(Continued)

(52) U.S. Cl.
CPC ......... *H05B 47/175* (2020.01); *G06F 3/0482* (2013.01); *G06F 3/04847* (2013.01); *H05B 47/11* (2020.01)

(58) Field of Classification Search
CPC ...... H05B 47/175; H05B 47/11; H05B 45/22; G06F 3/0482; G06F 3/04847
See application file for complete search history.

(56) References Cited

U.S. PATENT DOCUMENTS 8,742,694 B2    6/2014    Bora et al.
8,922,126 B2    12/2014    Bora et al.
(Continued)

FOREIGN PATENT DOCUMENTS

WO    WO-2018/130403 A1    7/2018

OTHER PUBLICATIONS

"Notification of Transmittal of the International Search Report and the Written Opinion of the International Searching Authority, or the Declaration," International Filing Date: Sep. 11, 2020, International Application No. PCT/US2020/050449, Applicant: Savant Systems, Inc., dated Nov. 11, 2020, pp. 1-14.

*Primary Examiner* — Minh D A
(74) *Attorney, Agent, or Firm* — Cesari and McKenna, LLP; James A. Blanchette

(57) ABSTRACT

In various embodiments, an architecture is provided for implementing circadian lighting in a home automation system having diverse lighting devices of different capabilities and manners of control. The architecture utilizes an outdoor sensor to capture current intensity and color temperature data for the outdoor environment. Color temperatures and intensities from a user-created circadian lighting curve are dynamically adjusted based on the current intensity and color temperature data for the outdoor environment to approximate changes that are occurring. The diverse lighting devices are controlled based on the dynamically adjusted temperatures and intensities.

19 Claims, 13 Drawing Sheets

(51) Int. Cl.
 *G06F 3/0482* (2013.01)
 *G06F 3/04847* (2022.01)

(56) References Cited

U.S. PATENT DOCUMENTS

| | | |
|---|---|---|
| 9,392,665 B2 | 7/2016 | Eisele et al. |
| 9,636,520 B2 | 5/2017 | Pedersen |
| 9,800,429 B2 | 10/2017 | Crayford et al. |
| 10,042,339 B2 | 8/2018 | Welingkar et al. |
| 10,321,541 B2 | 6/2019 | Bora et al. |
| 10,412,809 B2 | 9/2019 | van de Ven et al. |
| 2005/0063194 A1 | 3/2005 | Lys et al. |
| 2013/0249403 A1 | 9/2013 | Bora et al. |
| 2015/0002276 A1 | 1/2015 | Kicklighter et al. |
| 2016/0023017 A1 | 1/2016 | Moore-Ede et al. |
| 2016/0070244 A1 | 3/2016 | Cipollo et al. |
| 2016/0323972 A1 | 11/2016 | Bora et al. |
| 2017/0189640 A1 | 7/2017 | Sadwick |
| 2017/0348506 A1 | 12/2017 | Berman et al. |
| 2018/0077770 A1* | 3/2018 | Sooch ............... H05B 45/20 |
| 2018/0106675 A1* | 4/2018 | Yao .................. G01J 1/4228 |
| 2019/0259108 A1* | 8/2019 | Bongartz ............ A01C 21/005 |
| 2019/0268990 A1 | 8/2019 | Janik et al. |

* cited by examiner

CIRCADIAN LIGHTING IN A DIVERSE HOME AUTOMATION SYSTEM

RELATED APPLICATIONS

The present application claims the benefit of U.S. Provisional Patent No. 62/899,166 filed on Sep. 12, 2019 by Andrew R. Hamm et al., titled "Circadian Lighting in a Diverse Home Automation System", the contents of which are incorporated by reference herein in their entirety.

BACKGROUND

Technical Field

The present disclosure relates generally to device control and more specifically to an architecture for implementing circadian lighting in a home automation system having diverse lighting devices with different capabilities and manners of control.

Background Information

Research shows that humans and other animals have evolved "built-in clocks" that regulate the timing of biological processes relative to a day/night cycle. These "clocks" are known as circadian rhythms. While circadian rhythms are self regulating in the natural environment, modern lighting has been shown to disrupt them, delaying the production of melatonin and having other adverse health effects. Research shows that intense light from lighting devices, especially blue light that is found in high Kelvin (e.g. 4600K-6500K) "daylight" lighting, disrupts circadian rhythms. Intense light in this range may mimic sunlight in the middle of the day, confusing the body's perception of the day/night cycle.

To address this issue, there have recently been a number of efforts to implement circadian lighting in structures (e.g., residential or commercial structures), where the intensity (i.e. brightness) and/or color temperature of lighting devices is modulated through the day to mimic a day/night cycle. This sort of circadian lighting may minimize disruption of circadian rhythms and avoid adverse health effects. However, implementing circadian lighting poses a number of challenges.

One challenge is that many existing structures possess a diverse collection of lighting devices that have differing capabilities, and different manners in which they can be controlled. For example, some lighting devices may have both controllable color temperate and intensity. Other lighting devices may have only controllable intensity. Similarly, some lighting devices may be controllable via digital lighting control protocols (e.g., Digital Multiplex (DMX)). Other lighting devices may be controllable via a simple DC voltage control signal (e.g., 0-10 volt (V)). Other lighting devices may rely on an external device to change their output, for example, an external device that implements cut phase dimming of the high-voltage power supplied to the lighting device. It may be cost prohibitive or otherwise impractical to replace all lighting devices in a structure with ones having identical capabilities. Often, the practical result is that circadian lighting is only implemented on a portion of the lighting devices in the structure, and the remainder are left unchanged. This greatly reduces the benefit of implementing circadian lighting on the others.

Another challenge is that many existing efforts to implement circadian lighting are largely static, being unresponsive to current lighting conditions in the outdoor environment. Some simple systems may be completely unresponsive to seasonal changes in lighting conditions, such as changes in the time of sunrise and sunset. More sophisticated systems may account somewhat for such seasonal changes, but only approximately. For example, a user may be prompted to enter date and latitude and longitude data, which may be used to access a table of approximate sunrise and sunset times for the general region. However, such approximations are not tailored to the precise location of the structure and the local conditions (e.g., tall trees, mountains, etc.) there that may affect perceived sunrise or sunset times (e.g., cause lighting to perceivably increase or diminish at a time somewhat different than the official sunrise or sunset time). Still further, existing systems generally do not account for changes in current lighting conditions in the outdoor environment independent of seasonal changes. For example, current weather (e.g., cloud cover, rain, fog, etc.) may considerably change lighting conditions in the outdoor environment. Existing systems are typically unresponsive to such changes. As a result, existing systems often produce affects that appear unnatural and decoupled from the external world, diminishing the user experience, likelihood of adoption and thereby the benefits of circadian lighting.

Accordingly, there is a need for an architecture for implementing circadian lighting in a home automation system having diverse lighting devices with different capabilities and manners of control that is more responsive and dynamic.

SUMMARY

In various embodiments, an architecture is provided for implementing circadian lighting in a home automation system having diverse lighting devices of different capabilities and manners of control. The architecture utilizes an outdoor sensor to capture current intensity and color temperature data for the outdoor environment. Color temperature and intensity from a user-created circadian lighting curve are dynamically adjusted based on the current intensity and color temperature data for the outdoor environment to approximate changes that are occurring. The diverse lighting devices are controlled based on the dynamically adjusted temperature and intensity.

More specifically, in one embodiment, a circadian lighting (also referred to as "daylight mode") configuration user interface is provided by a control application (app) executing on a control device (e.g., a remote control, a mobile device, a host controller or other electronic device). Using the configuration user interface, a user selects desired color temperature and intensity for one or more time periods, for example, a different color temperature and intensity for each of a plurality of different predefined time periods (e.g., morning, day, evening and night) defining a circadian lighting curve. An outdoor sensor collects current intensity and color temperature data for lighting in the outdoor environment. The circadian lighting curve color temperature and intensity, the current intensity and color temperature from the outdoor sensor, and current time from a system clock are provided to a dynamic color manager process executing on a host controller. The dynamic color manager process utilizes a research-based lighting algorithm to combine the circadian lighting curve color temperature and intensity applicable to the current time and the current color temperature and intensity from the outdoor sensor (e.g., to mimic the current color temperature intensity and intensity in the outdoor environment) thereby producing an optimal color temperature and dimming value for the current time. As lighting conditions change in the outdoor environment, the dynamic color manager process updates the optimal color temperature and/or dimming value to change dynamically therewith.

The dynamic color manager process provides the optimal color temperature and dimming value to a service request manager process also executing on the host controller. The service request manager process determines whether circadian lighting (aka "daylight mode") is currently enabled in a room, and if so, provides the current optimal color temperature and dimming value to a lighting control process, also executing on the host controller. The lighting control process converts the current optimal color temperature and dimming value to one or more sets of individual lighting commands and sends these to one or more lighting control devices of the room (for example, lighting controllers (e.g., DMX or 0-10 v), wireless gateway devices (e.g., Bluetooth low energy (BLE) gateways), non-wireless gateway devices (e.g., wallbox dimmers or plugin dimmers), panel bridge controllers, etc.) and the like. The lighting control devices translate received sets of lighting commands to digital control values, low-voltage analog signals or modulated high-voltage power (e.g., RBGW values, 0-10 v dimming and color signals, high-voltage cut phase, etc.) as the case may be given the capabilities of diverse lighting devices in the room (for example, wireless lighting devices (e.g., DMX or 0-10 v), line-level lighting devices, etc.), and such commands, values or power are sent to the respective lighting devices. By the conversions performed by the lighting control process, the current color temperature and dimming value for each room is translated into approximations achievable given the different capabilities of the lighting devices in the room.

It should be understood that a variety of additional features and alternative embodiments may be implemented. This Summary is intended simply as a brief introduction to the reader, and does not indicate or imply that the examples mentioned herein cover all aspects of the invention, or are necessary or essential aspects of the invention.

BRIEF DESCRIPTION OF THE DRAWINGS

The description below refers to the accompanying drawings of example embodiments, of which.

DETAILED DESCRIPTION

Definitions

As used herein, the term "home automation system" should be interpreted broadly to encompass various types of home control, "smart home", and/or device control systems that may control devices (e.g., lighting devices, display devices, electric window shades, HVAC devices, and/or other types of devices) within a structure, such as a residential dwelling or commercial building.

As used herein, the term "mobile device" refers to an electronic device that executes a general-purpose operating system and is adapted to be transported on one's person. Devices such as smartphones should be considered mobile devices. Desktop computers, servers, or other primarily-stationary computing devices generally should not be considered mobile devices.

As user herein, the term "gateway device" refers to a device of a home automation system that includes multiple wireless interfaces/adaptors that utilize different wireless communication protocols and that is capable of receiving control commands via one wireless communication protocol (e.g., Wi-Fi) and forwarding the control commands via another wireless communication protocol (e.g., BLE).

An Example Home Automation System Architecture

Figure 1:
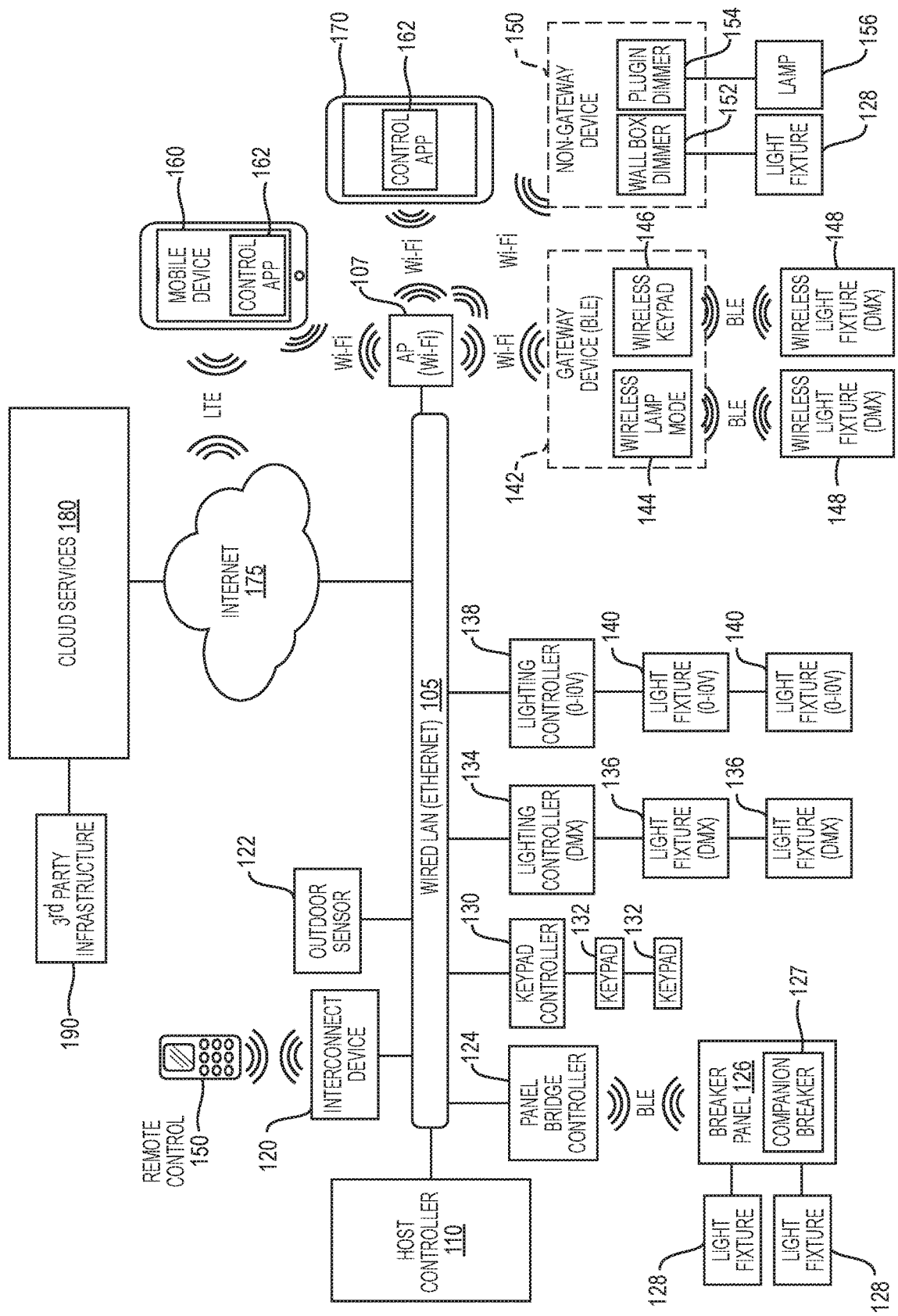
FIG. 1 is a block diagram of an example architecture of a home automation system implementing circadian lighting with diverse lighting devices of different capabilities and manners of control.

FIG. 1 is a block diagram of an example architecture 100 of a home automation system implementing circadian lighting with diverse lighting devices of different capabilities and manners of control. At the core of the system is a host controller 110 coupled to an in-home wired local area network (LAN) 105, for example, an Ethernet LAN, which is in turn coupled to an AP 107, for example, a Wi-Fi AP, that provides an in-home WLAN.

The host controller 110 may include hardware components such as a processor, a memory and a storage device, which collectively store and execute host software (including a dynamic color manager, service request manager, lighting control process, and other software) configured to monitor and control the operations of devices 120-156; provide UI interpretation, system administration and monitoring; perform synchronization with cloud services 180; provide activity recording services; provide activity prediction services; and/or provide other types of functionality. The host controller 110 may also maintain in its storage device a home database that stores configuration information including information regarding devices 120-156 controlled by the home automation system and their capabilities, as well as information about remote controls 150, mobile devices 160, and other electronic devices 170 that provide a graphical user interface (GUI) for controlling the devices 120-156.

The devices 120-156 controlled by the home automation system may take a number of different forms. The devices 156 may include audio devices and video devices 124 (collectively A/V devices) (not shown), such as display devices (e.g., televisions, monitors, etc.), A/V device controllers, media servers, audio amplifiers, cable boxes, and the like. The devices 120-156 may also include motor and/or relay operated devices (e.g., shade controllers, electronic shades, electronic door locks, etc.), security devices, heating ventilation and cooling (HVAC) devices, etc. (not shown).

The devices 120-156 may further include lighting devices that have a variety of different capabilities and manners of control. Some lighting devices support control of both color temperature and intensity. Such lighting devices may include lighting controllers coupled via wired connections (e.g., Ethernet connections) to the wired LAN 105, which control individual light fixtures and/or lamps by sending them digital control values or low-voltage signals. For example, a DMX lighting controller 134 may be coupled via a wired connection (e.g., Ethernet connection) to the wired LAN 105 and control individual lighting devices 136 (e.g. light fixtures) coupled thereto by wired connections which pass RBGW values. Likewise, a 0-10V lighting controller 138 may be coupled via a wired connection (e.g., Ethernet connection) to the wired LAN 105 and control individual light fixtures and/or lamps 140 coupled thereto by wired connections which pass 0-10 v dimming and color signals. Such lighting devices may include lighting controllers that support wireless communication. For example, gateway devices 142, such as a wireless lamp module 144 and wireless keypad 146, may receive commands via the WLAN (e.g., Wi-Fi) and control individual wireless light fixtures and/or lamps 148 by sending them RBGW values over a wireless personal area network (WPAN) (e.g., BLE).

Other lighting devices may support control of only intensity. Such lighting devices may include lighting controllers coupled via wired connections (e.g., Ethernet connections) to the wired LAN 105, which control individual light fixtures and/or lamps. For example, a panel bridge controller 124 and breaker panel 126 mounted companion breakers 127 may control individual lighting devices 128 (e.g., light fixtures) coupled thereto by sending them modulated high-voltage power (e.g., high-voltage cut phase). Between the panel bridge controller 124 and the companion breakers 127, a WPAN (e.g., BLE) may be used to pass channel dimming values. Likewise, non-gateway devices 150, such as a wall-box dimmer 152 and plugin dimmer 154, may receive control commands via the WLAN (e.g., Wi-Fi) and control individual wireless lighting devices, such as light fixtures 128 and lamps 156, by sending them modulated high-voltage power (e.g., high-voltage cut phase).

The lighting devices may be controlled by interface devices, such as keypads 132 coupled to a keypad controller 130, or a wireless keypad 146. Also, a remote control 150, mobile device 160 or another electronic device 170 may be utilized. A remote control 150 may include a touch sensitive display screen, physical buttons, a WLAN interface (e.g., a Wi-Fi interface), a WPAN adaptor (e.g., a BLE adaptor), a processor, a memory and a storage device that stores and executes a control app configured to interface with the host controller 110 and cloud services 180. The control app on the remote control 150 may present a circadian lighting ("daylight mode") configuration user interface with screens for configuring circadian lighting as well as further user interface screens for controlling rooms with configured circadian lighting, among other functionality. In some cases, a remote control 150 may communicate with an interconnection device 120, such as an infrared (IR) blaster.

Further, a mobile device 160 may include a touch sensitive display screen, a WLAN interface (e.g., a Wi-Fi interface), a WPAN adaptor (e.g., a BLE adaptor), a processor, a memory and a storage device that stores and executes a control app 162 configured to interface with the host controller 110 and/or cloud services 180. The control app on the mobile device 160 may present a circadian lighting ("daylight mode") configuration user interface with screens for configuring circadian lighting as well as further user interface screens for controlling rooms with configured circadian lighting, among other functionality.

Still further, a tablet computer, a dedicated touch screen unit, or other electronic device 170 may be utilized. The electronic device 170 may include a display screen (e.g., touch sensitive, non-touch sensitive, etc.), an input device, a WLAN interface (e.g., a Wi-Fi interface), a WPAN adaptor (e.g., a BLE adaptor), a processor, a memory and a storage device that stores and executes a control app 162 configured to interface with the host controller 110 and/or cloud services 180. The control app on the electronic device 170 may present a circadian lighting ("daylight mode") configuration user interface with screens for configuring circadian lighting as well as further user interface screens for controlling rooms with configured circadian lighting, among other functionality.

Some devices (e.g., a host controller 110, a mobile device 160, another electronic device 170, etc.) may communicate via the Internet 175 with cloud services 180. Cloud services may include host application program interfaces (APIs) and mobile APIs and provide remote access to home automation control; a persistent backup of the home database, for example, storing data in a configuration database; interfaces to third party infrastructure, for example, via third party adaptors; user profiles and usage tracking, for example, storing data in a user database; a mechanism for over-the-air updates; host crash reporting; license management; as well as a variety of other functionality.

Figure 2:
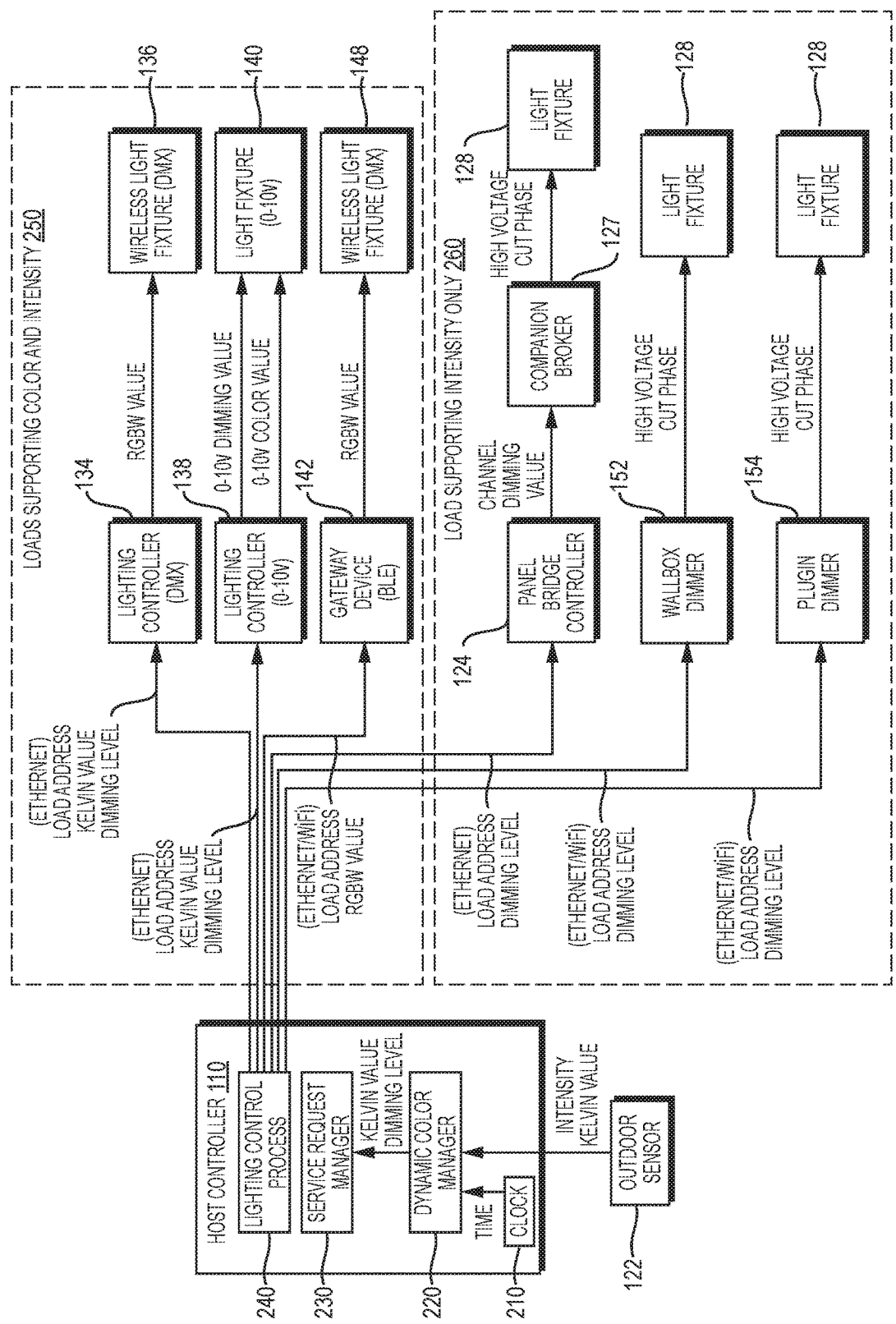
FIG. 2 is a block diagram illustrating an example arrangement for circadian lighting in a home automation system having diverse lighting devices of different capabilities and manners of control.

FIG. 2 is block diagram illustrating an example arrangement for circadian lighting in a home automation system having diverse lighting devices of different capabilities and manners of control. User selections of desired color temperature and intensity for predefined time periods (e.g., morning, day, evening and night) defining a circadian lighting curve are entered in the circadian lighting ("daylight mode") configuration user interface provided by the control app executing on a control device and transmitted to a dynamic color manager process 220 executing on the host controller 110. An outdoor sensor 112 collects current intensity and color temperature data (e.g., a Kelvin value) for lighting in the outdoor environment, which along with current time from a system clock 210, is also provided to the dynamic color manager process 220 executing on the host controller 110. The dynamic color manager process 220 utilizes a research-based lighting algorithm to combine color temperature and intensity from the circadian lighting curve applicable to the current time and the current color temperature and intensity from the outdoor sensor 112 (e.g., to mimic the current color temperature intensity and intensity in the outdoor environment), thereby producing an optimal color temperature and dimming value for the current time. For example, if the current color temperature and/or intensity from the outdoor sensor 112 is lower than the color temperature and intensity from the circadian lighting curve applicable to the current time, the dynamic color manager process 220 may decrease the circadian lighting curve color temperature and/or intensity (e.g., to match the color temperature and/or intensity from the outdoor sensor 112 or to move one or more increments closer to the color temperature and/or intensity from the outdoor sensor 112). Likewise, if the current color temperature and/or intensity from the outdoor sensor 112 is higher than the circadian lighting curve color temperature and intensity applicable to the current time, the dynamic color manager process 220 may increase the circadian lighting curve color temperature and/or intensity (e.g., to match the color temperature and/or intensity from the outdoor sensor 112 or to move one or more increments closer to the color temperature and/or intensity from the outdoor sensor 112). Effectively, as lighting conditions change in the outdoor environment, the dynamic color manager process 220 updates the optimal color temperature and/or dimming value to change dynamically therewith.

The dynamic color manager process 220 provides the optimal color temperature and dimming value to a service request manager 230 executing on the host controller 110. For each room, the service request manager 110 determines whether circadian lighting (aka "daylight mode") is currently enabled in the room, and if so, provides the optimal color temperature and dimming value to a lighting control process 240, also executing on the host controller 110. The lighting control process 240 converts the current optimal color temperature and dimming value to one or more sets of individual lighting commands and sends these to one or more lighting control devices of the room. Depending on the lighting control device, different individual lighting commands may be sent by different means. For example, looking to lighting devices supporting color temperature and intensity: a DMX lighting controller 134 and a 0-10 v lighting controller 138 may be sent a load address, Kelvin value and dimming level by Ethernet, and a gateway device 142 may be sent a load address, Kelvin value and RGBW value by Ethernet and WLAN (e.g. Wi-Fi). Looking to lighting devices supporting intensity only: a panel bridge controller 124 may be sent a load address and dimming level by Ethernet, and a wallbox dimmer 152 and a plugin dimmer 154 may be sent a load address and dimming level via Ethernet and WLAN (e.g. Wi-Fi).

The lighting control devices translate received sets of lighting commands into control values, low-voltage signals or modulated high-voltage power, as the case may be given the capabilities of diverse lighting fixtures in each room, that are sent to individual lighting devices. For example, looking to lighting devices supporting color temperature and intensity: a DMX lighting controller 134 translates the lighting commands into RGBW values that are sent to DMX lighting devices 136 via a wired link, a 0-10 v lighting controller 138 translates the lighting commands into 0-10 v dimming and color signals that are sent to lighting devices 140 via a wired link, and a gateway device 142 translates the lighting commands into RGBW values that are sent to wireless lighting devices 148 over a WPAN (e.g., BLE). Looking to lighting devices supporting intensity only: a panel bridge controller 124 translates the lighting commands into a channel dimming value that is sent via a WPAN (e.g., BLE) to a companion breaker 127 that provides modulated high-voltage power (e.g., high-voltage cut phase) to a lighting device 128, and a wallbox dimmer 152 and a plugin dimmer 154 translate the lighting commands into modulated high-voltage power (e.g., high-voltage cut phase) supplied to a lighting device 128. By the conversions performed by the lighting control process, the current color temperature and dimming value are translated into approximations achievable given the different capabilities of the lighting fixtures in the room.

Figure 3A:
FIGS. 3A-3K are a series of example screen shots of a configuration user interface that may be provided by the control app executing on a remote control, mobile device or other electronic device.
Figure 3B:
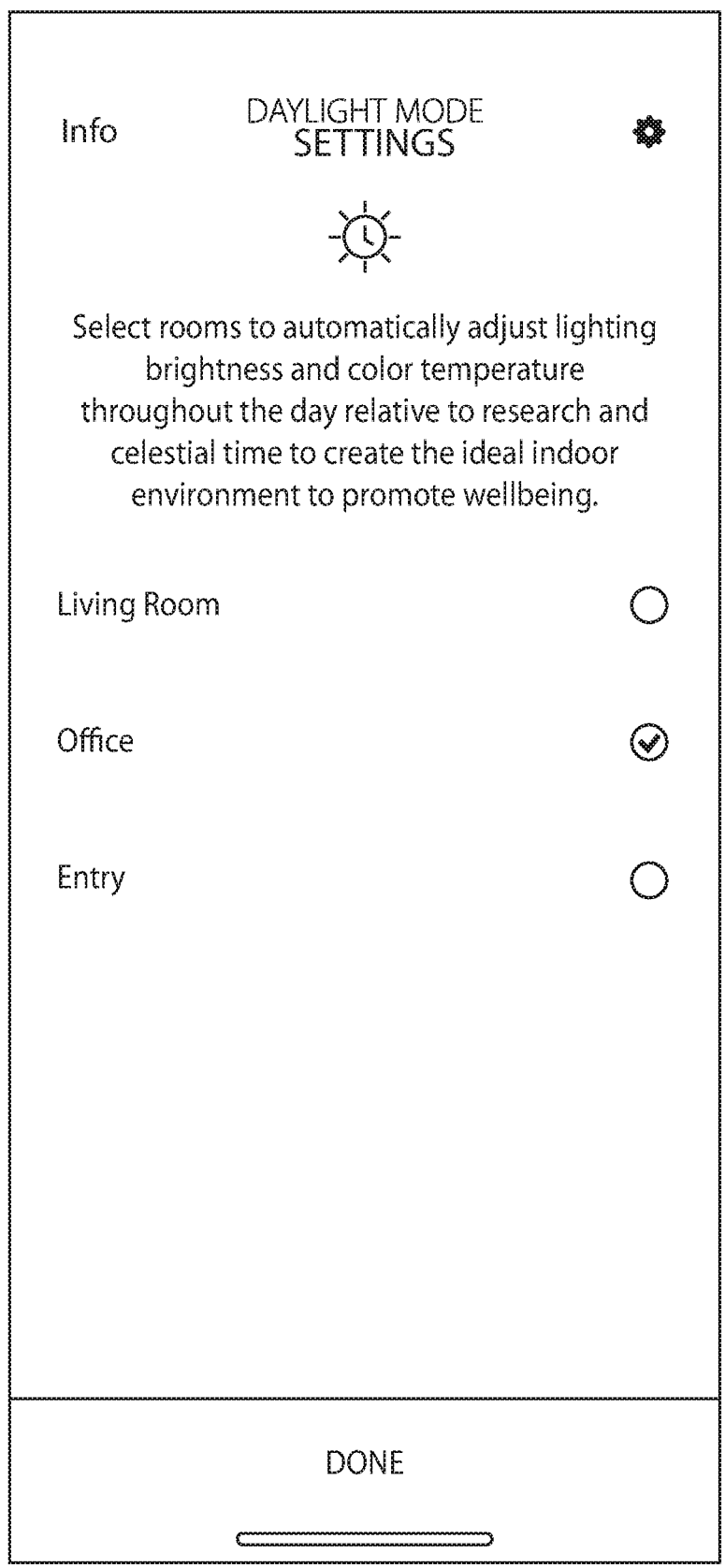
Figure 3C:
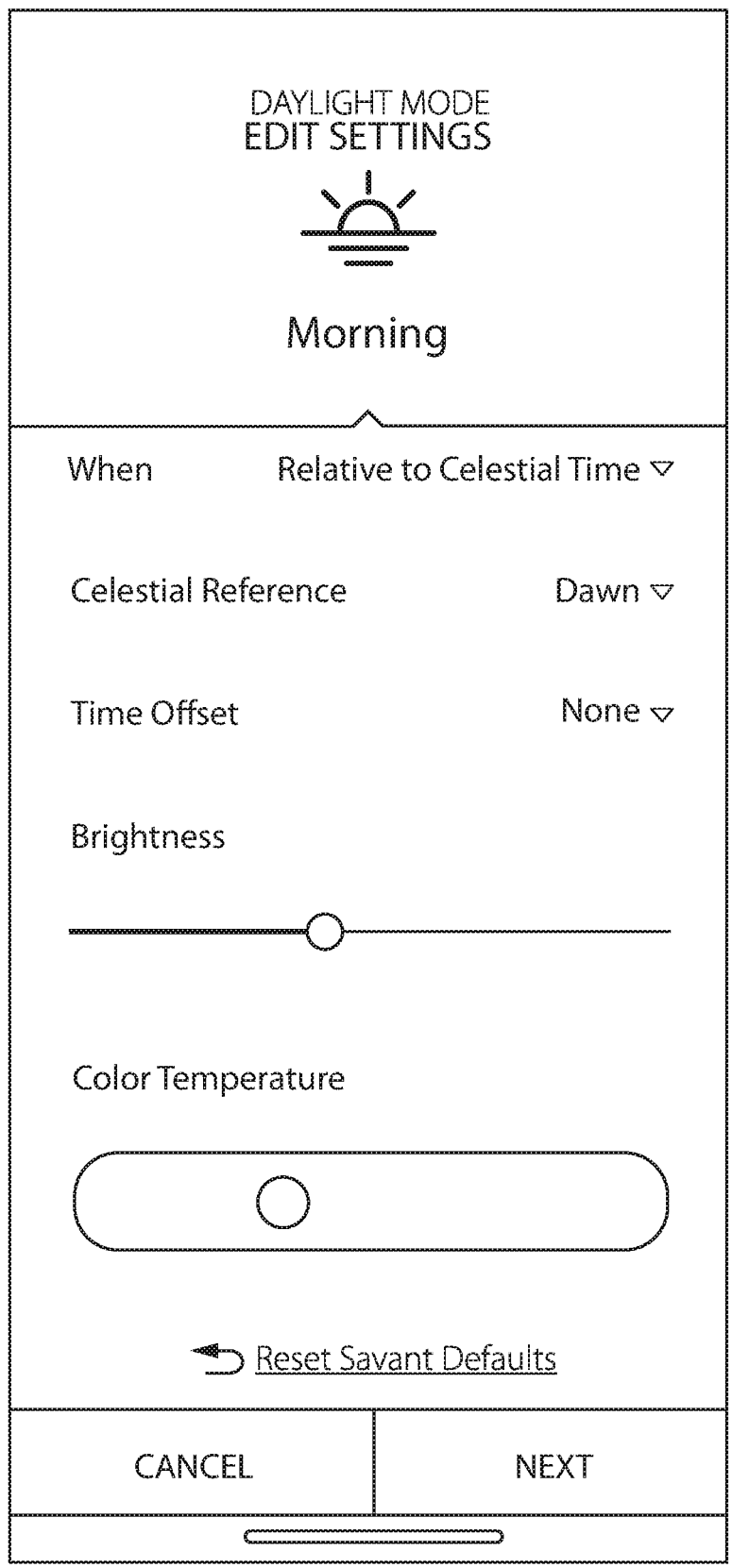
Figure 3D:
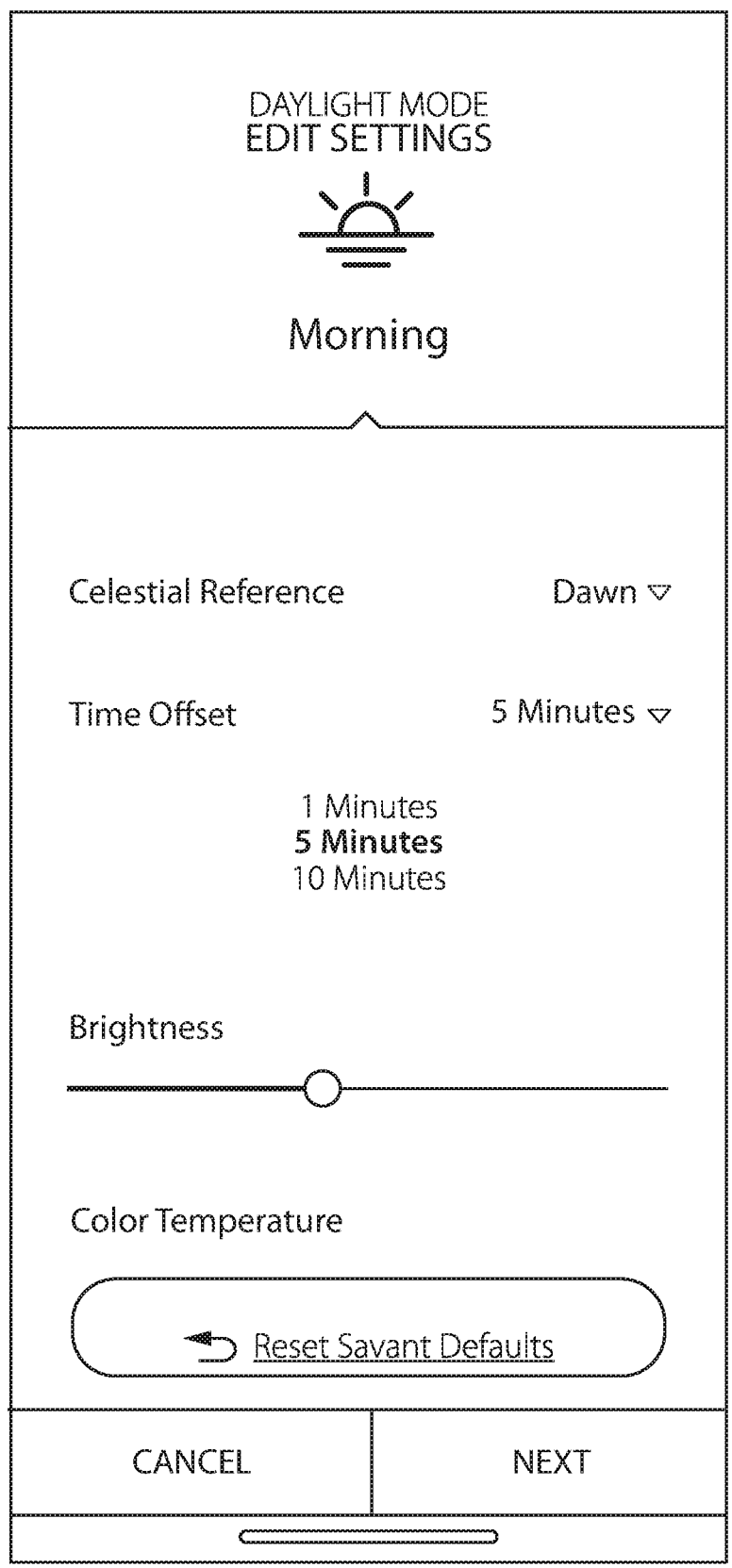
Figure 3E:
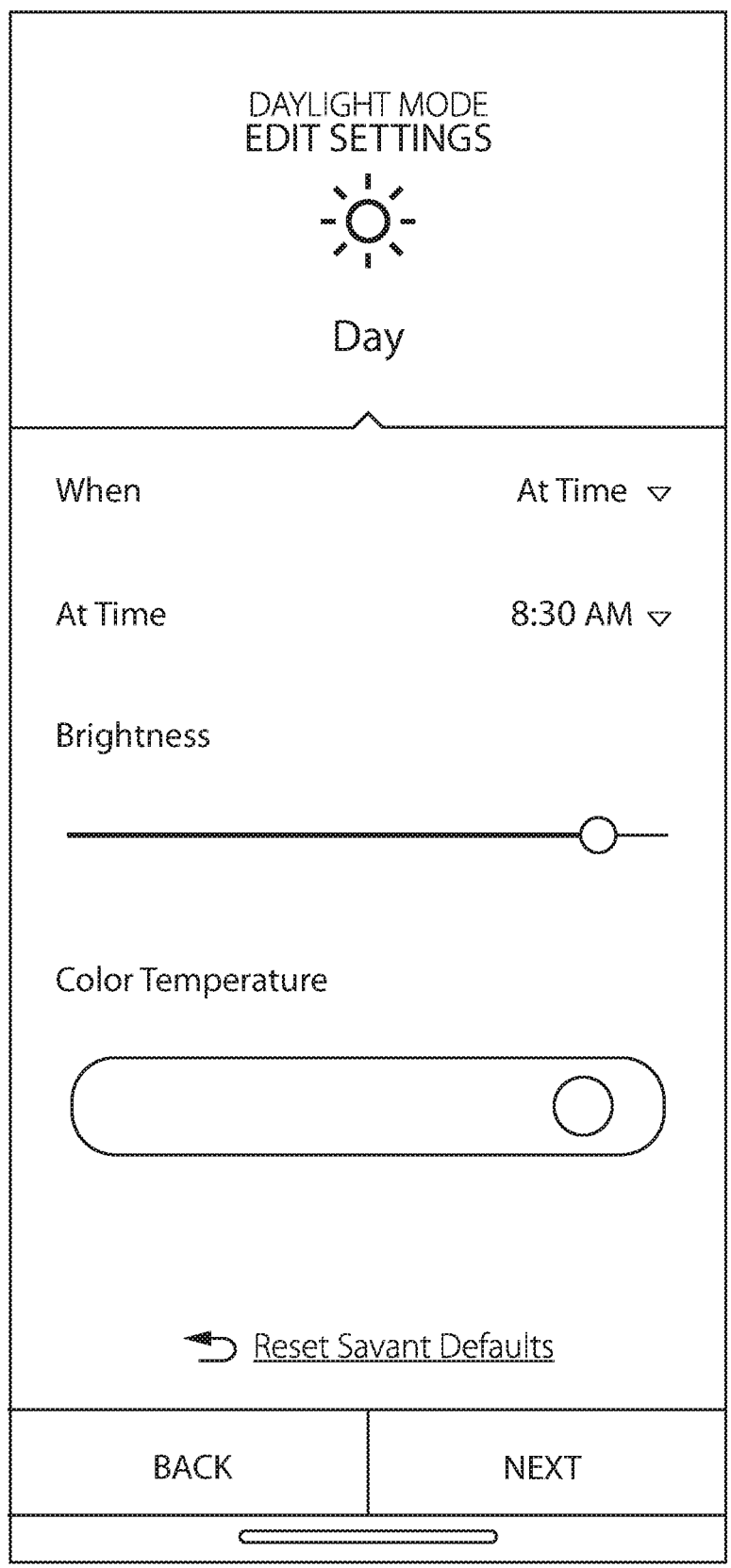
Figure 3F:
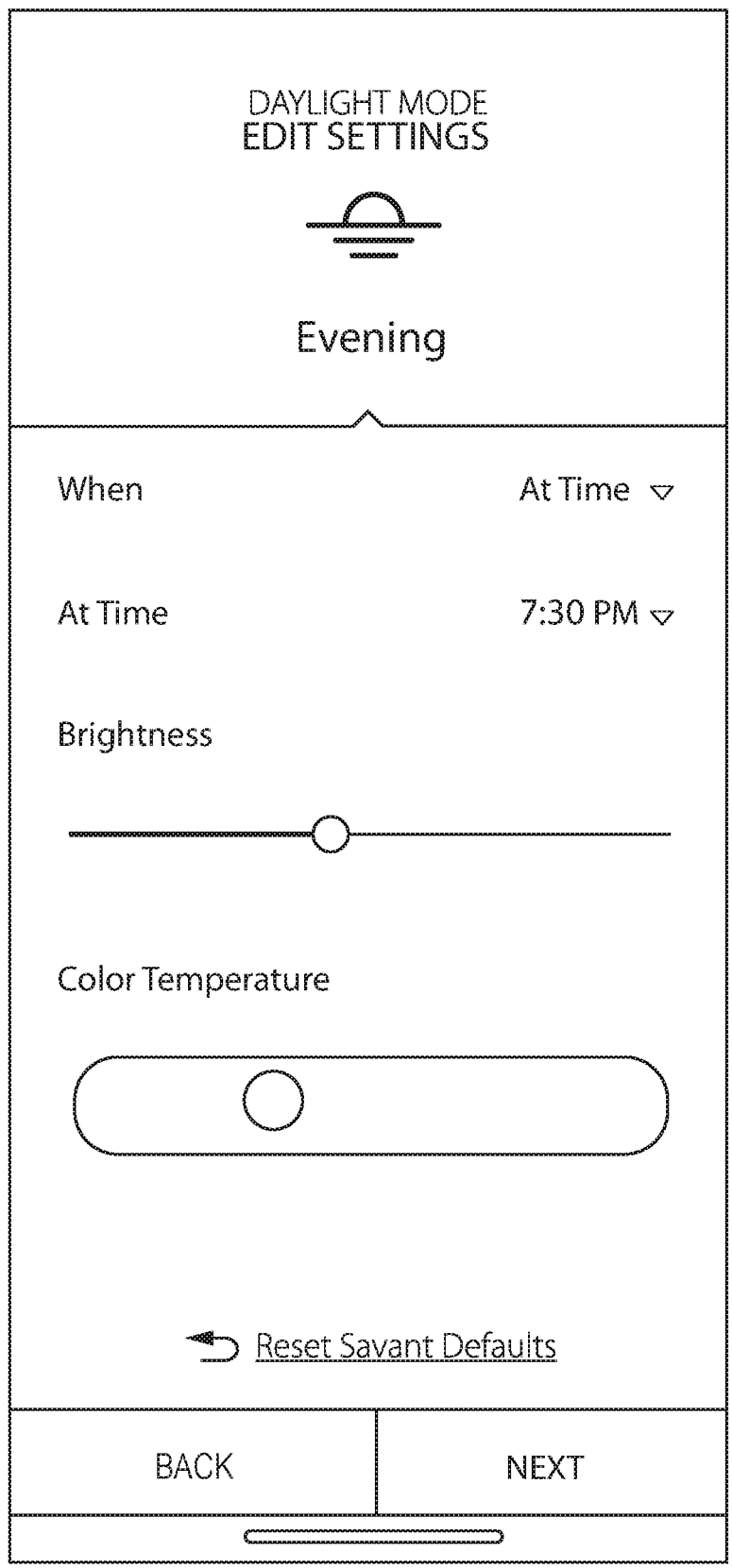
Figure 3G:
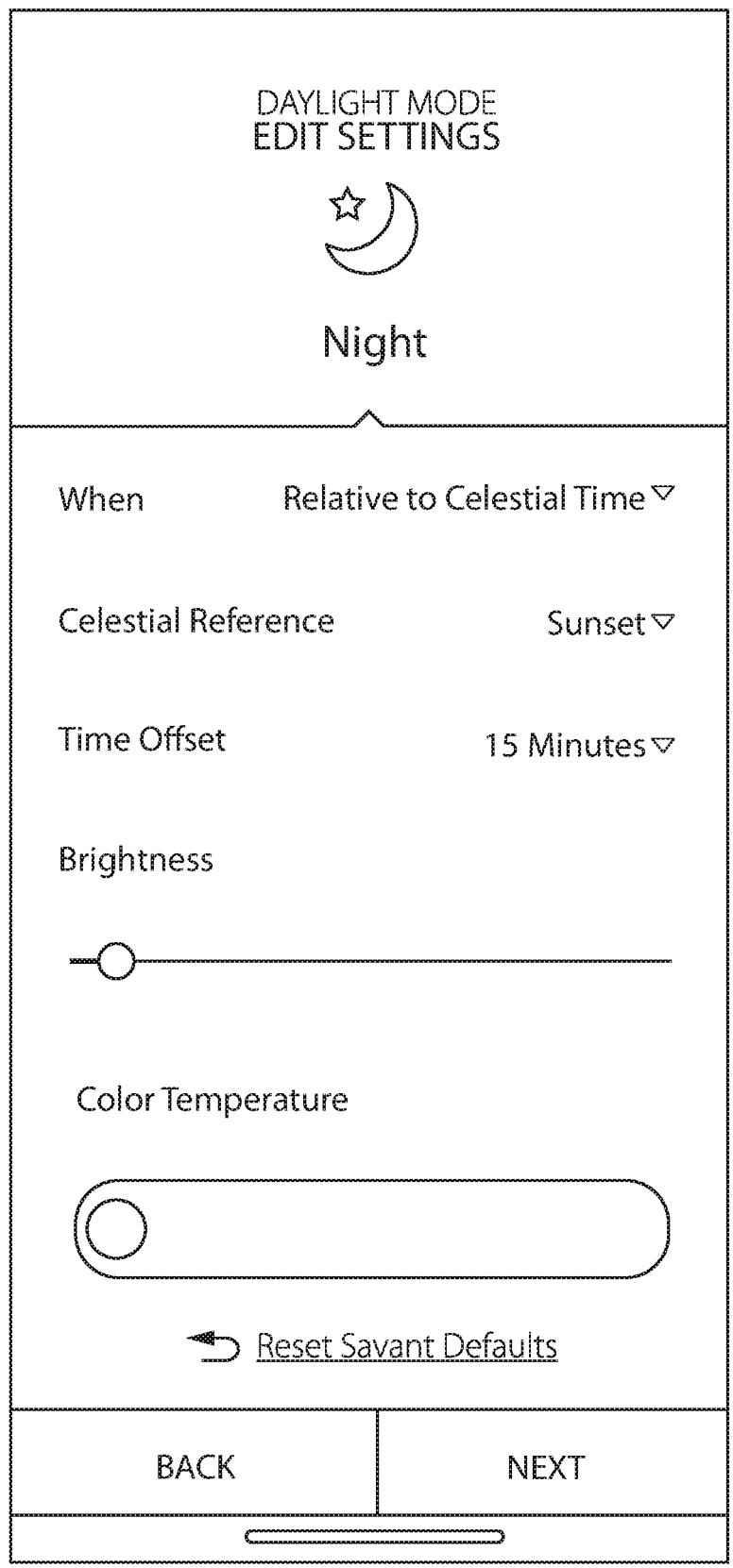
Figure 3H:
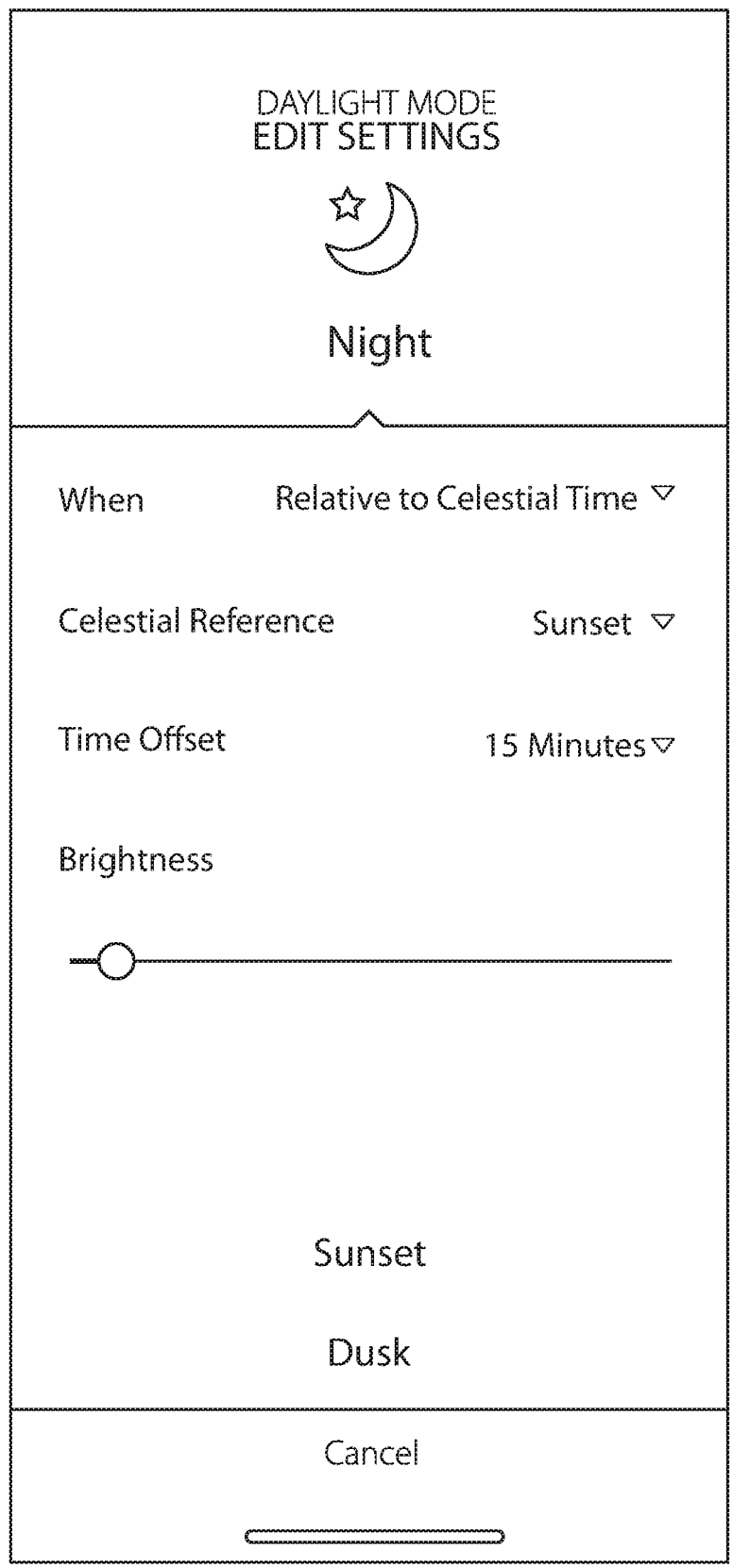
Figure 3I:
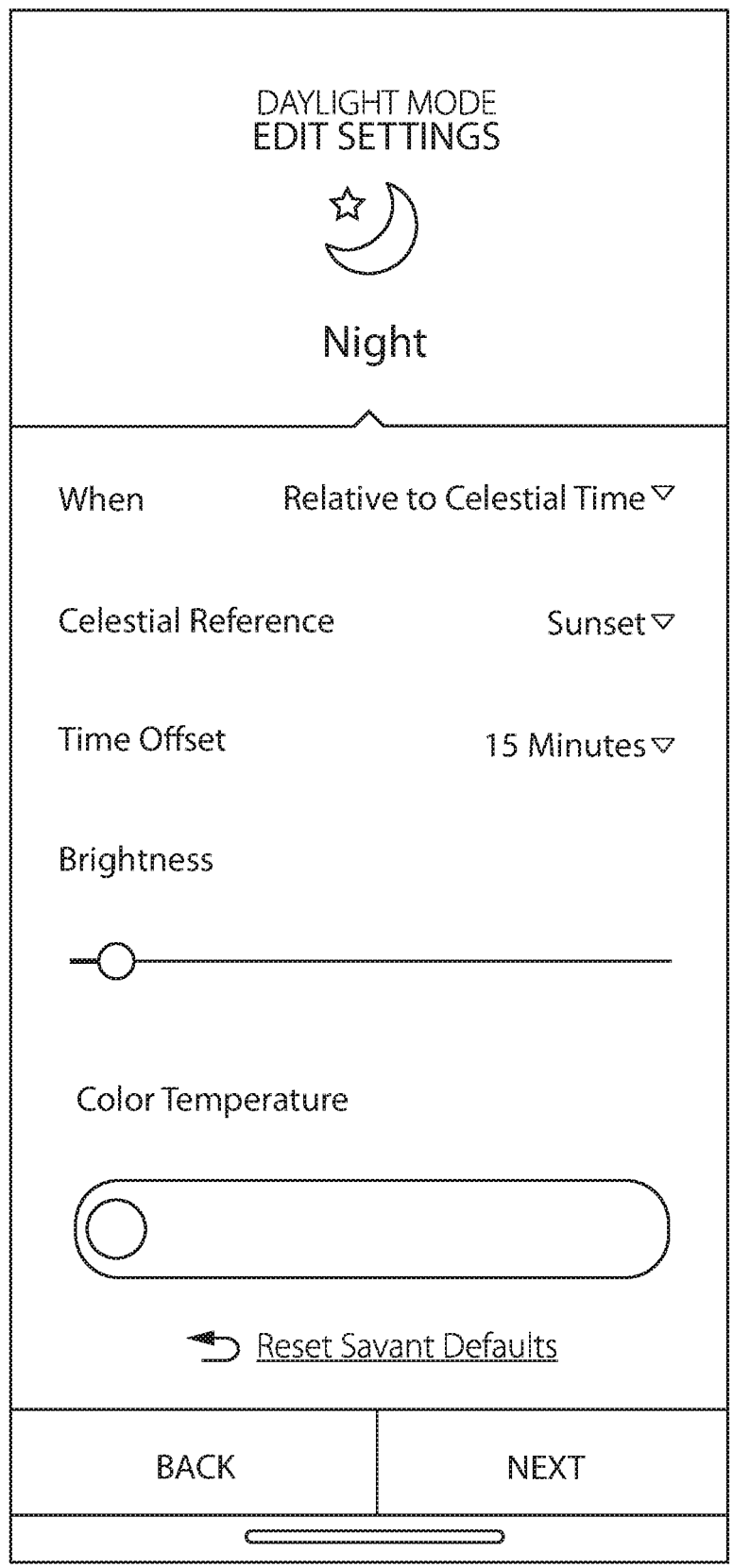
Figure 3J:
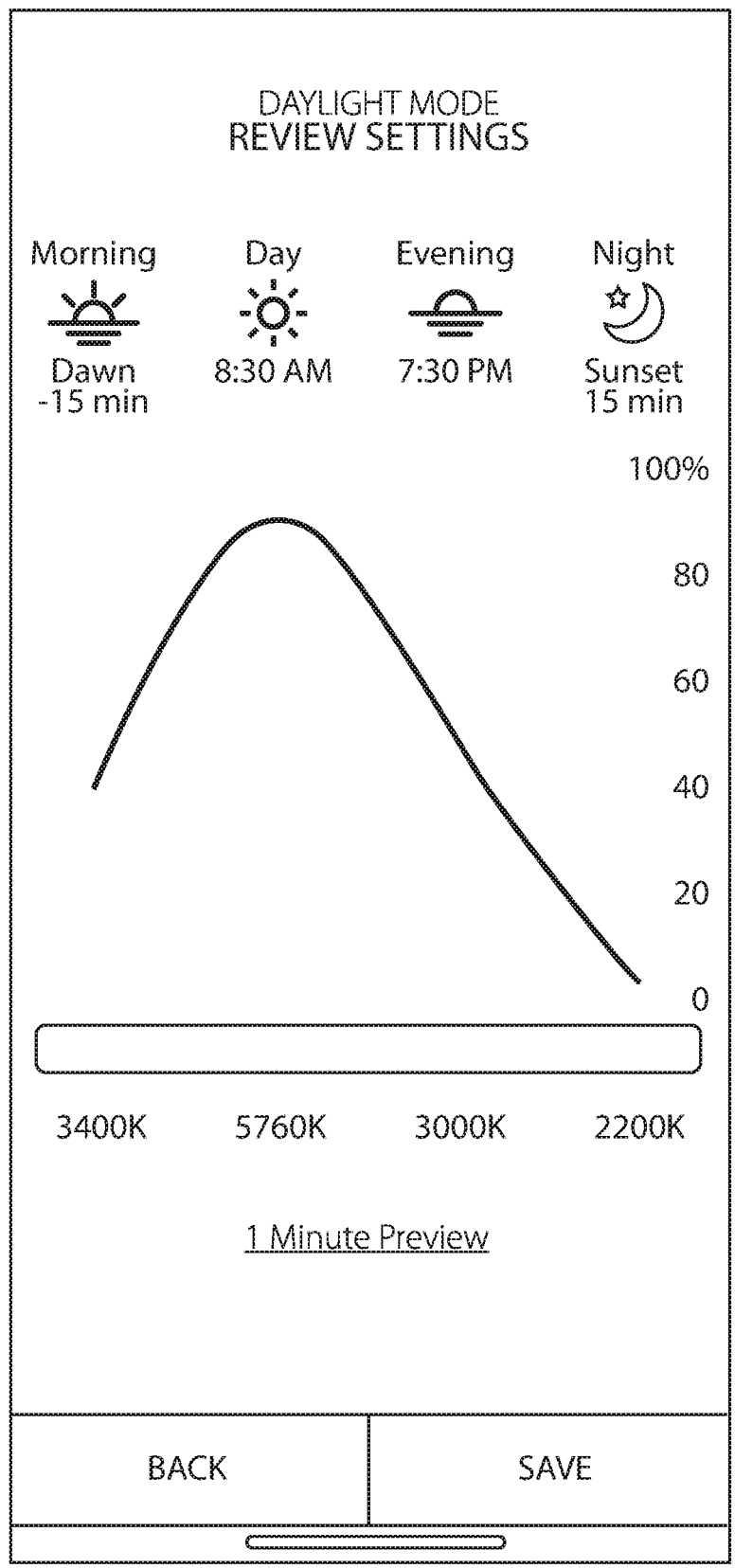
Figure 3K:
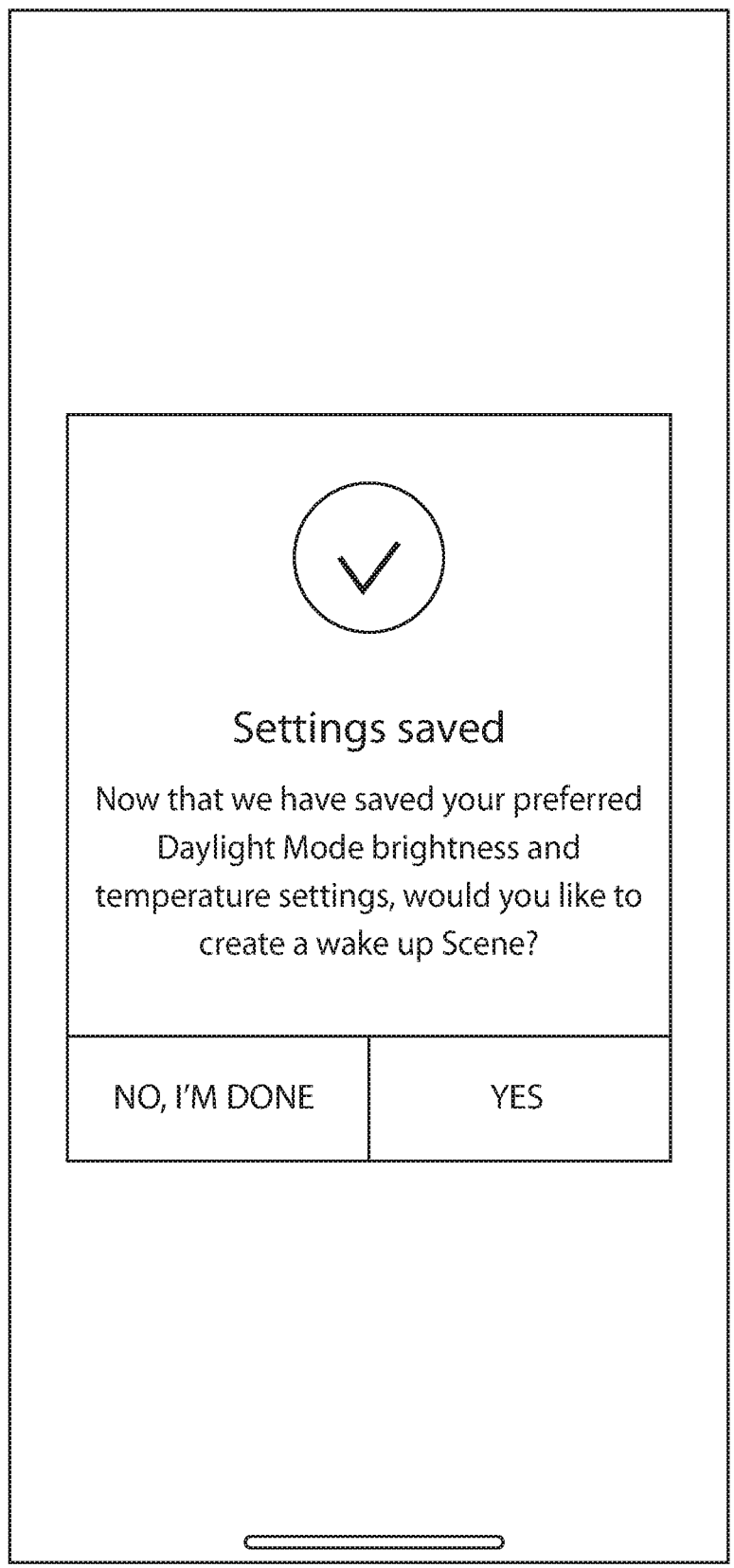

FIGS. 3A-3J, are a series of example screen shots of a configuration user interface that may be provided by the control app executing on a remote control 150, mobile desvice 160 or another electronic device 170. In FIGS. 3A-3B, the configuration user interface prompts a user to select a room to enable circadian lighting (aka "daylight mode"). The user is also promoted to select a desired color temperature and intensity for predefined time periods (e.g., morning, day, evening and night) to define a circadian lighting curve. In FIGS. 3C-3D, the user selects color temperature and intensity for a morning time period. The user may also select a celestial reference and time offset, or a specific clock time, defining when the morning time period begins. In FIG. 3E, the user selects color temperature and intensity for a daytime period. The user may also select a specific clock time defining when the daytime period begins. In FIG. 3F, the user selects color temperature and intensity for an evening time period. The user may also select a specific clock time defining when the evening time period begins. In FIGS. 3G-3I, the user selects color temperature and intensity for a nighttime period. The user may also select a celestial reference and time offset, or specific clock time, defining when the nighttime period begins. In some cases, working with the dynamic color manager process 220, the control app may obtain projected optimal color temperatures and dimming values. Such projected optimal color temperatures and dimming values may be based in part on historic or generalized outdoor environment data. In FIG. 3J, the user is displayed a graph that indicates a preview of projected optimal color temperatures and dimming values throughout the day for a room. The user may also be provided an option to preview projected optimal color temperatures and dimming values for circadian lighting at an accelerated pace (e.g., 24 hours condensed to 1 minute) in the actual room. In FIG. 3K, configuration of circadian lighting completes.

In summary, an architecture is provided for implementing circadian lighting in a home automation system having diverse lighting devices of different capabilities and manners of control that utilizes an outdoor sensor to capture current intensity and color temperature data for the outdoor environment. While the above description uses certain specific examples, it should be apparent that a number of modifications and/or additions may be made thereto. Additionally, it should be understood that many the operations and steps described above may be implemented in hardware, software (embodied as a non-transitory electronic device-readable media including software), firmware, or a combination thereof. A non-transitory electronic device-readable media may take the form of a memory, such as a Random Access Memory (RAM), a disk, such as a hard drive or flash device, or other tangible storage media. In general, it should be understood that the above descriptions are meant to be taken only by way of example.

What is claimed is:

1. A method for circadian lighting in a home automation system, comprising:
   receiving, in a user interface of an electronic device, user selections of color temperature and intensity for a structure having a plurality of rooms that define a circadian lighting curve;
   receiving, in the user interface, a user selection of a room of the plurality of rooms in which to activate circadian lighting;
   determining a current color temperature and intensity of lighting in an outdoor environment by an outdoor sensor;
   calculating, by a dynamic color manager process executing on the electronic device or another electronic device, an optimal color temperature and dimming value by combining a color temperature and intensity from the circadian lighting curve and the current color temperature and intensity of lighting in the outdoor environment from the outdoor sensor, wherein the combining performed by the dynamic color manager process decreases color temperature or dimming value from that indicated by the circadian lighting curve if the current color temperature or intensity from the outdoor sensor is lower than that from the circadian lighting curve, and the combining increases color temperature or dimming value from that indicated by the circadian lighting curve if the current color temperature or intensity from the outdoor sensor is higher than that from the circadian lighting curve; and
   converting the optimal color temperature and dimming value into individual sets of lighting commands that control individual lighting devices of the room,
   wherein the lighting devices of the room include lighting devices with different capabilities, including one or more lighting devices that have controllable color temperature and intensity and one or more lighting devices that have only controllable intensity.

2. The method of claim 1, further comprising:
updating the optimal color temperature and/or dimming value in response to changes in current color temperature or intensity of lighting in the outdoor environment.

3. The method of claim 1, further comprising:
sending the individual sets of lighting commands to respective lighting control devices for the room; and
translating the individual sets of lighting commands to digital control values, analog signals or modulated power that is sent to individual lighting devices.

4. The method of claim 3, wherein the one or more lighting control devices include one or more lighting controllers, wireless gateways or dimmers.

5. The method of claim 1, wherein the calculating further comprises:
comparing a current time from a system clock to a time period; and
in response to the current time falling within the time period, calculating the optimal color temperature and dimming value, and converting the optimal color temperature and dimming value into individual sets of lighting commands.

6. The method of claim 5, wherein the time period is a predefined time period defined based on at least one of a celestial reference or a specific clock time.

7. The method of claim 5, wherein the predefined time period is one of a plurality of predefined time periods that each have a different color temperature and intensity.

8. The method of claim 1, further comprising:
providing a preview in the user interface including an indication of the optimal color temperature and intensity for at least one time.

9. A home automation system for providing circadian lighting, comprising:
a control application (app) executing on a control device configured to provide a user interface arranged to receive user selections of a color temperature and an intensity that define a circadian lighting curve;
an outdoor sensor configured to determine current color temperature and intensity of lighting in an outdoor environment; and
a host controller in communication with the control device and the outdoor sensor and configured to execute a dynamic color manager process that is operable to:
calculate an optimal color temperature and intensity by combining a color temperature and intensity from the circadian lighting curve and the current color temperature and intensity of lighting in the outdoor environment from the outdoor sensor, wherein the combining decreases color temperature or intensity from that indicated by the circadian lighting curve if the current color temperature or intensity from the outdoor sensor is lower than that from the circadian lighting curve, and the combining increases color temperature or intensity from that indicated by the circadian lighting curve if the current color temperature or intensity from the outdoor sensor is higher than that from the circadian lighting curve, and
convert the optimal color temperature and intensity into individual sets of lighting commands that control individual lighting devices of a room.

10. The method of claim 9, wherein the dynamic color manager process is further configured operable to update the optimal color temperature and/or intensity in response to changes in current color temperature or intensity of lighting in the outdoor environment.

11. A non-transitory electronic device readable medium having software stored thereon that when executed by one or more electronic devices is operable to:
receive user selections of color temperature and intensity for a structure having a plurality of rooms that define a circadian lighting curve;
receive a user selection of a room of the plurality of rooms in which to activate circadian lighting;
calculate an optimal color temperature and dimming value by combining color temperature and intensity from the circadian lighting curve and the current color temperature and intensity of lighting from a sensor, wherein the optimal color temperature and dimming value differs from the color temperature and intensity from the circadian lighting curve, wherein the combining decreases color temperature or dimming value from that indicated by the circadian lighting curve if the current color temperature or intensity from the sensor is lower than that from the circadian lighting curve, and the combining increase color temperature or dimming value from that indicated by the circadian lighting curve if the current color temperature or intensity from the sensor is higher than that from the circadian lighting curve; and
convert the optimal color temperature and dimming value into individual sets of lighting commands that control individual lighting devices of the room.

12. The non-transitory electronic device readable medium of claim 11, wherein the software when executed is further operable to:
update the optimal color temperature and/or dimming value in response to changes in current color temperature or intensity of lighting in the outdoor environment.

13. The non-transitory electronic device readable medium of claim 11, wherein the software when executed is further operable to:
send the individual sets of lighting commands to respective lighting control devices for the room; and
translate the individual sets of lighting commands to digital control values, analog signals or modulated power that is sent to individual lighting devices.

14. The non-transitory electronic device readable medium of claim 11, wherein the one or more lighting control devices include one or more lighting controllers, wireless gateways or dimmers.

15. The non-transitory electronic device readable medium of claim 11, wherein the software when executed is further operable to:
compare a current time from a system clock to a time period; and
in response to the current time falling within the time period, calculate the optimal color temperature and dimming value, and convert the optimal color temperature and dimming value into individual sets of lighting commands.

16. The non-transitory electronic device readable medium of claim 11, wherein the time period is a predefined time period defined based on at least one of a celestial reference or a specific clock time.

17. The non-transitory electronic device readable medium of claim 11, wherein the predefined time period is one of a plurality of predefined time periods that each have a different color temperature and intensity.

18. The non-transitory electronic device readable medium of claim 11, wherein the sensor is an outdoor sensor and the data includes color temperature and intensity of lighting in an outdoor environment.

19. The non-transitory electronic device readable medium of claim 11, wherein the software when executed is further operable to:

provide a preview including an indication of the optimal color temperature and intensity for at least one time.

\* \* \* \* \*

UNITED STATES PATENT AND TRADEMARK OFFICE
CERTIFICATE OF CORRECTION

| | |
|---|---|
| PATENT NO. | : 11,785,694 B2 |
| APPLICATION NO. | : 17/018556 |
| DATED | : October 10, 2023 |
| INVENTOR(S) | : Andrew R. Hamm et al. |

Page 1 of 1

It is certified that error appears in the above-identified patent and that said Letters Patent is hereby corrected as shown below:

In the Specification

Column 7, Lines 48-49:
"control app executing on a remote control 150, mobile des
vice 160 or another electronic device 170. In Figs. 3A-3B,"
Should read:
-- control app executing on a remote control 150, mobile de-
vice 160 or another electronic device 170. In Figs. 3A-3B, --

In the Claims

Claim 10:
Column 9, Line 67:
"manager process is further configured operable to update the"
Should read:
-- manager process is further operable to update the --

Signed and Sealed this
First Day of April, 2025

Coke Morgan Stewart
*Acting Director of the United States Patent and Trademark Office*